(12) United States Patent
Sun et al.

(10) Patent No.: US 8,184,926 B2
(45) Date of Patent: May 22, 2012

(54) IMAGE DEBLURRING WITH BLURRED/NOISY IMAGE PAIRS

(75) Inventors: Jian Sun, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1103 days.

(21) Appl. No.: 11/961,752

(22) Filed: Dec. 20, 2007

(65) Prior Publication Data

US 2008/0240607 A1  Oct. 2, 2008

Related U.S. Application Data

(60) Provisional application No. 60/892,108, filed on Feb. 28, 2007.

(51) Int. Cl.
   *G06K 9/40* (2006.01)
   *G06K 9/36* (2006.01)
   *H04N 9/74* (2006.01)
   *G09G 5/00* (2006.01)

(52) U.S. Cl. ......... 382/275; 382/284; 348/584; 345/629

(58) Field of Classification Search .................. None
    See application file for complete search history.

(56) References Cited

U.S. PATENT DOCUMENTS

| 7,616,826 B2 * | 11/2009 | Freeman et al. ............. 382/255 |
| 2002/0027600 A1 | 3/2002 | Yamanaka et al. |
| 2006/0171569 A1 * | 8/2006 | Budagavi ..................... 382/107 |

FOREIGN PATENT DOCUMENTS

| JP | 2004242362 | | 8/2004 |
| JP | 2006295316 | | 10/2006 |
| JP | 2007027969 | * | 1/2007 |
| JP | 2007027969 | | 2/2007 |

OTHER PUBLICATIONS

International Search Report and Written Opinion, PCT/US2008/053114, Jun. 26, 2008, 10 pages.

* cited by examiner

*Primary Examiner* — Randolph I Chu
(74) *Attorney, Agent, or Firm* — Lee & Hayes, PLLC (57) ABSTRACT

Image deblurring with blurred/noisy image pairs is described. In one implementation, a system combines a blurred image with a corresponding noisy image of the same subject to create a high-quality deblurred image. The blurred/noisy image pair can be acquired by an inexpensive hand-held camera, e.g., in unfavorable low light conditions. An exemplary iterative process uses the blurred image and the noisy image at each step to produce the high-quality image. First, the system estimates the blur kernel of the blurred image using information from both the blurred and noisy images. Then, the system performs residual image deconvolution, which favors suppression of ringing artifacts. Finally, the system applies gain-controlled deconvolution to suppress remaining ringing artifacts in smooth image regions. The system iterates these steps to obtain the final high-quality image.

20 Claims, 5 Drawing Sheets

IMAGE DEBLURRING WITH BLURRED/NOISY IMAGE PAIRS

RELATED APPLICATIONS

This patent application claims priority to U.S. Provisional Patent Application No. 60/892,108 to Sun et al., entitled, "Image Deblurring with Blurred/Noisy Image Pairs," filed Feb. 28, 2007 and incorporated herein by reference.

BACKGROUND

Capturing satisfactory photos under low light conditions using a hand-held camera can be a frustrating experience. Often the photos taken are blurred due to camera shake, or noisy. The brightness of the image can be increased in three ways. First, reducing the shutter speed can improve the brightness. But with a shutter speed below a safe level (the reciprocal of the focal length of the lens, in second units), camera shake will result in a blurred image. Second, using a large aperture can improve the brightness. A large aperture will, however, reduce the depth of field. Moreover, the range of apertures in a consumer-level camera is very limited. Third, setting a high ISO, can increase brightness. In traditional film photography ISO (or ASA) is an indication of how sensitive a film is to light. In digital photography, ISO measures the sensitivity of the image sensor. The lower the number, the less sensitive the camera is to light and the finer the grain. Higher ISO settings are generally used in darker conditions to obtain faster shutter speeds, however the tradeoff is noisier images. Thus, a high ISO image can be very noisy because the noise is amplified as the camera's gain increases. To take a sharp image in an environment of dim lighting, the best settings are safe shutter speed, large aperture, and high ISO. Even with this combination, the captured image may still be dark and very noisy. Another solution is to use flash, which unfortunately may introduce artifacts such as specularities and shadows. Moreover, flash may not be effective for distant objects. One approach is to reduce shutter speed to improve brightness and then try to remove the resultant blurriness.

In single image deblurring, the deblurring can be categorized into two types: blind deconvolution and non-blind deconvolution. The former is more difficult to achieve since the blur kernel is unknown. The real kernel caused by camera shake is complex, beyond the simple parametric form (e.g., single one-direction motion or a Gaussian) assumed in conventional approaches. Natural image statistics together with a sophisticated variational Bayes inference algorithm have been used to estimate the kernel. The image is reconstructed using a standard non-blind deconvolution algorithm. Pleasing results are obtained when the kernel is small (e.g., 30×30 pixels or fewer), but kernel estimation for a large blur is inaccurate and unreliable using a single image.

Even with a known kernel, non-blind deconvolution is still under-constrained. Reconstruction artifacts, e.g., "ringing" effects or color speckles, are inevitable because of high frequency loss in the blurred image. The errors due to sensor noise and quantizations of the image/kernel are also amplified in the deconvolution process. For example, more iterations in the Richardson-Lucy (RL) algorithm will result in more "ringing" artifacts.

Spatially variant kernel estimation has also been proposed. The image is segmented into several layers with different kernels. The kernel in each layer is uni-directional and the layer motion velocity is constant. Hardware-based solutions to reduce image blur include lens stabilization and sensor stabilization. Both techniques physically move an element of the lens, or the sensor, to counterbalance the camera shake. Typically, the captured image can be as sharp as if it were taken with a shutter speed 2-3 stops faster.

Single image denoising is a classic problem that is extensively studied. The challenge in image denoising is how to compromise between the tradeoff of removing noise while preserving edge or texture. Commercial softwares often use wavelet-based approaches. Bilateral filtering is also a simple and effective method widely used in computer graphics. Other approaches include anisotropic diffusion, PDE-based methods, fields of experts, and nonlocal methods.

One conventional technique consists of a primary sensor (high spatial resolution) and a secondary sensor (high temporal resolution). The secondary sensor captures a number of low resolution, sharp images for kernel estimation. However, this approach requires multiple images and special hardware. Another conventional technique uses a pair of images, where the colors of the blurred image are transferred into the noisy image without kernel estimation. However, this approach is limited to the case that the noisy image has a high SNR and fine details.

SUMMARY

Image deblurring with blurred/noisy image pairs is described. In one implementation, a system combines a blurred image with a corresponding noisy image of the same subject to create a high-quality deblurred image. The blurred/noisy image pair can be acquired by an inexpensive hand-held camera, e.g., in unfavorable low light conditions. An exemplary iterative process uses the blurred image and the noisy image at each step to produce the high-quality image. First, the system estimates the blur kernel of the blurred image using information from both the blurred and noisy images. Then, the system performs residual image deconvolution, which favors suppression of ringing artifacts. Finally, the system applies gain-controlled deconvolution to suppress remaining ringing artifacts in smooth image regions. The system iterates these steps to obtain the final high-quality image.

This summary is provided to introduce the subject matter of image deblurring with blurred/noisy image pairs, which is further described below in the Detailed Description. This summary is not intended to identify essential features of the claimed subject matter, nor is it intended for use in determining the scope of the claimed subject matter.

DETAILED DESCRIPTION

Overview

This disclosure describes image deblurring using a pair of images consisting of a blurred image of a given subject and a corresponding noisy image taken of the same subject, i.e., a blurred/noisy image pair. An exemplary system uses these two images, which can be captured by an inexpensive, off-the-shelf camera in less-than-ideal conditions, e.g., low light levels, to produce a high-quality image from information in the two low-quality images.

Taking satisfactory photos under dim lighting conditions using a hand-held camera is challenging. If the camera is set to a long exposure time, the image is blurred due to camera shake. On the other hand, the image is dark and noisy if it is taken with a short exposure time but with a high camera gain. By combining information extracted from both blurred and noisy images, however, the exemplary system produces a high-quality image that cannot be obtained by simply denoising the noisy image, or deblurring the blurred image.

Exemplary System

Figure 1:
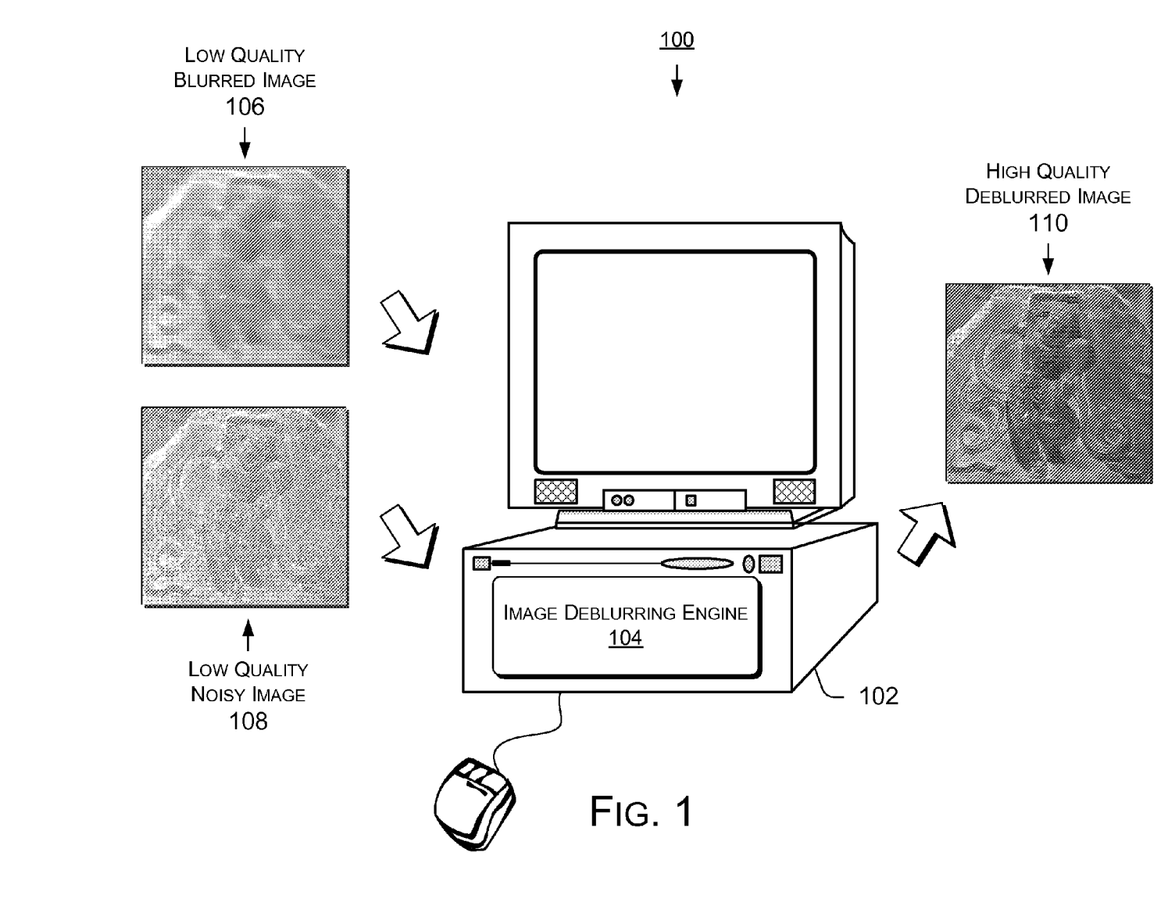
FIG. 1 is a diagram of an exemplary image deblurring system.

FIG. 1 shows an exemplary image deblurring system 100. A computing device 102, such as a desktop or notebook computer, or other device that has a processor, memory, data storage, etc., hosts an exemplary image deblurring engine 104. The image deblurring engine 104 receives two low-quality images 106 and 108 acquired by a camera and produces one high-quality image 110 from the information inherent in the two low-quality images 106 and 108. That is, the high-quality image 110 is produced by combining two degraded images 106 and 108. The image deblurring engine 104 may also be hosted by the camera or cell phone that acquires the degraded images 106 and 108, instead of being hosted by a computing device 102, per se.

One of the degraded images 106 is typically a blurred image 106 that is taken with a slow shutter speed and a low ISO setting, e.g., in low light conditions. With enough light, the blurred image 106 has the correct color, intensity and a high Signal-Noise Ratio (SNR). But it is blurred due to camera shake vulnerability of the camera settings. The other degraded image 108 is an underexposed and noisy image 108 with a fast shutter speed and a high ISO setting. The noisy image 108 is sharp but very noisy due to insufficient exposure and high camera gain.

An otherwise conventional digital camera may be configured to take the blurred image 106 and the noisy image 108 in rapid succession. If the camera also hosts the image deblurring engine 104, then the net user experience is a relatively inexpensive camera that takes low-quality photos in low light conditions and produces a high-quality image. The user will not be aware that the camera is also acquiring a second image at substantially the same time as the first image. Or put another way, the camera takes a blurry photo, e.g., in less-than-ideal lighting conditions, and unobtrusively takes a second photo almost simultaneously at different settings to gather enough information to correct the first photo into a high-quality image.

The exemplary image deblurring engine 104 performs a blur kernel estimation using the blurred/noisy image pair 106 and 108. Then, an exemplary residual image deconvolution and a gain-controlled image deconvolution are applied as de-ringing techniques to suppress ringing artifacts during the image deconvolution, again using information from both the blurred and noisy images 106 and 108.

Exemplary Engine

Figure 2:
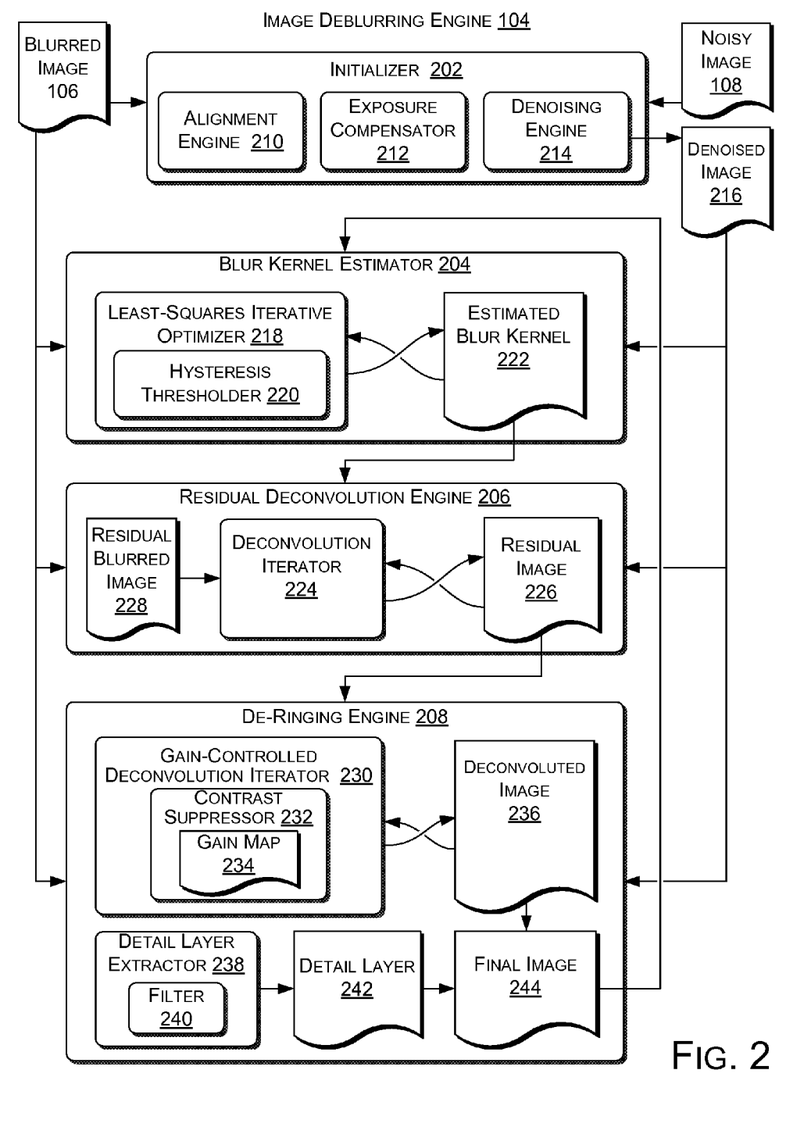
FIG. 2 is a block diagram of an exemplary image deblurring engine.

FIG. 2 shows an example version of the exemplary image deblurring engine 104 of FIG. 1, in greater detail. The illustrated implementation is only one example configuration, for descriptive purposes. Many other arrangements of the components of an exemplary image deblurring engine 104 are possible within the scope of the subject matter. Such an exemplary image deblurring engine 104 can be executed in hardware, software, or combinations of hardware, software, firmware, etc.

The exemplary image deblurring engine 104 includes an initializer 202, a blur kernel estimator 204, a residual deconvolution engine 206, and a de-ringing engine 208. The initializer 202, in turn, includes an image alignment engine 210, an exposure compensator 212, and a denoising engine 214 to produce a denoised image 216 version of the noisy image 108.

In one implementation, the blur kernel estimator 204 includes a least-squares iterative optimizer 218 and a hysteresis thresholder 220 to iteratively produce an estimated blur kernel 222.

In one implementation, the residual deconvolution engine 206 includes a deconvolution iterator 224 to iteratively produce a residual image 226 from a residual blurred image 228.

In one implementation, the de-ringing engine 208 includes a gain-controlled deconvolution iterator 230, a contrast suppressor 232, and a gain map 234 to produce a deconvoluted image 236. A detail layer extractor 238 and filter 240 extract a detail layer 242 to be combined with the deconvoluted image 236 to produce the final image 244.

Operation of the Exemplary Engine

In one sense, the exemplary image deblurring engine 104 can be viewed as deblurring the blurred image 106 with the assistance of the noisy image 108. First, the blur kernel estimator 204 uses both images 106 and 108 to determine an accurate blur kernel 222 that is otherwise difficult to obtain from a single blurred image 106. Second, the residual deconvolution engine 206 again uses both images 106 and 108 to significantly reduce ringing artifacts inherent to the image deconvolution. Third, the de-ringing engine 208 further suppresses the remaining ringing artifacts in smooth image regions by a gain-controlled deconvolution process. The effectiveness of the exemplary image deblurring engine 104 has been demonstrated using indoor and outdoor images taken by off-the-shelf hand-held cameras in poor lighting environments.

Recovering a high-quality image 110 from a very noisy image 108 is not a trivial task, as fine image details and textures are concealed in noise. Denoising cannot completely separate image signals from noise. On the other hand, deblurring from a single blurred image 106 is a challenging blind deconvolution problem. Both blur kernel (or Point Spread Function) estimation and image deconvolution are highly under-constrained. Moreover, unpleasant artifacts (e.g., ringing) from image deconvolution, even when using a perfect kernel, also appear in the reconstructed image.

In one implementation, the image deblurring engine 104 formulates this difficult image reconstruction problem as an image deblurring problem, using the pair of the blurred image 106 and the noisy image 108. Like many conventional image deblurring techniques, the image deblurring engine 104 operates under an initial assumption that the image blur can be well-described by a single blur kernel caused by camera shake. The image deblurring engine 104 converts the blind deconvolution problem into two non-blind deconvolution problems: non-blind kernel estimation and non-blind image deconvolution. In kernel estimation, the blur kernel estimator 204 recovers a very accurate initial kernel 222 from the blurred image 106 by exploiting the large-scale, sharp image structures in the noisy image 108. In one implementation, the blur kernel estimator 204 can handle larger kernels than those conventionally recovered from a single blurred image 106.

The residual deconvolution engine 206 greatly reduces the ringing artifacts that commonly result from the image deconvolution process. Then, the de-ringing engine 208 uses a gain-controlled deconvolution process to further suppress the ringing artifacts in smooth image regions. All three components—the blur kernel estimator 204, the residual deconvolution engine 206, and the de-ringing engine 208 (gain-controlled deconvolution)—take advantage of both images 106 and 108. The final reconstructed image 110 is sharper than the blurred image 106 and clearer than the noisy image 108.

The exemplary image deblurring approach is practical despite using two images 106 and 108. Experiments have found that the motion between two blurred/noisy images 106 and 108, when taken in a quick succession, is mainly a translational motion. This is significant because the kernel estimation is independent of the translational motion, which only results in an offset of the kernel. Acquiring a blurred/noisy image pair and a description of how the alignment engine 210 aligns such images 106 and 108 will be presented further below.

The exemplary image deblurring engine 104 receives the pair of images, the blurred image B 106 taken with a slow shutter speed and low ISO, and the noisy image N 108 taken with high shutter speed and high ISO. The noisy image 108 is usually underexposed and has a very low SNR since camera noise is dependent on the image intensity level. Moreover, the noise in the high ISO image 108 is also larger than that in the low ISO image 106 since the noise is amplified by camera gain. But the noisy image 108 is sharp because of a fast shutter speed that is above the safe shutter speed.

The exposure compensator 212 pre-multiplies the noisy image 108 by a ratio $$\frac{ISO_B \Delta t_B}{ISO_N \Delta t_N}$$

to compensate for the exposure difference between the blurred image 106 and the noisy image 108, where $\Delta t$ is the exposure time. In one implementation, the exposure compensator 212 performs the multiplication in irradiance space then reverts back to image space if the camera response curve is known. Otherwise, a gamma ($\gamma$=2.0) curve is used as an approximation.

The goal is to reconstruct a high-quality image I 110 using the input images, the blurred image B 106 and the noisy image N 108, as in Equation (1):

$$B = I \otimes K \qquad (1)$$

where K is the blur kernel 222 and $\otimes$ is the convolution operator. For the noisy image N 108, the denoising engine 214 computes a denoised image $N_D$ 216. In one implementation, the denoising engine 214 applies a wavelet-based denoising technique to the noisy image N 108. Such a denoising technique can be one of the available state-of-art techniques, for example, available from several commercial denoising softwares. Bilateral filtering has also been tried for the denoising, but in this approach it is hard to achieve a good balance between removing noise and preserving detail, even with careful parameter tuning.

The denoised image $N_D$ 216 loses some fine detail in the denoising process, but preserves the large-scale, sharp image structures. The lost detail layer is represented as a residual image $\Delta I$, as in Equation (2):

$$I = N_D + \Delta I \qquad (2)$$

In one implementation, the denoised image $N_D$ 216 is a very good initial approximation for 1 in Equation (1) for the purpose of kernel estimation. The residual image $\Delta I$ is relatively small with respect to denoised image $N_D$ 216. The power spectrum of the image I lies mainly in the denoised image $N_D$ 216. Moreover, the large-scale, sharp image structures in denoised image $N_D$ 216 make important contributions for kernel estimation. Exemplary experiments on synthetic and real images show that accurate kernels can be obtained using blurred image B 106 and denoised image $N_D$ 216 in non-blind convolution.

Once the blur kernel estimator 204 estimates kernel K 222, Equation (1) can again be used to non-blindly deconvolute I, but unfortunately this results in significant artifacts, for example, ringing effects. Thus, instead of recovering I directly, the residual deconvolution engine 206 first recovers the residual image $\Delta I$ from the blurred image B 106. By combining Equations (1) and (2), the residual image $\Delta I$ can be reconstructed from a residual deconvolution, as shown in Equation (3):

$$\Delta B = \Delta I \otimes K \qquad (3)$$

where $\Delta B = B - N_D \otimes K$ is a residual blurred image.

The ringing artifacts from residual deconvolution of $\Delta I$ (i.e., Equation (3)) are smaller than those from deconvolution of I (Equation (1)) because $\Delta B$ has a much smaller magnitude than B after being offset by $N_D \otimes K$.

The denoised image $N_D$ 216 also provides a crucial gain signal to control the deconvolution process for suppressing ringing artifacts, especially in smooth image regions. The de-ringing engine 208 uses a gain-controlled deconvolution technique to further reduce ringing artifacts.

The above three components: the blur kernel estimator 204, the residual deconvolution engine 206, and the de-ringing engine 208 (gain-controlled deconvolution)—operate iteratively to refine the estimated blur kernel K 222 and the deconvoluted image 1226.

Exemplary Blur Kernel Estimator

In one implementation, the blur kernel estimator 204 includes the least-squares iterative optimizer 218 to perform a simple constrained least-squares optimization, which produces a very good initial kernel estimation 222.

The blur kernel estimator 204 finds the blur kernel K 222 from $B = I \otimes K$ with the initialization $I = N_D$. In vector-matrix form, it is b=Ak, where b and k are the vector forms of B and K, and A is the matrix form of I.

If A were the true image, it would be the standard linear least-squares for solving k. In one implementation, the blur kernel estimator 204 uses a Tikhonov regularization method with a positive scalar $\lambda$ to stabilize the solution by solving $\min_k \|Ak - b\|^2 + \lambda^2 \|k\|^2$. In one implementation, the default value of $\lambda$ is set at 5. The solution is given by $(A^T A + \lambda^2 I)k = A^T b$ in closed-form if there are no other constraints on the kernel k. But a real blur kernel has to be non-negative and preserve energy, so the optimal kernel is obtained from the following optimization system, in Equation (4):

$$\min_k \|Ak - b\|^2 + \lambda^2 \|k\|^2, \text{ subject to } k^i \geq 0, \text{ and } \sum_i k_i = 1. \qquad (4)$$

In one implementation, the Landweber method is adopted to iteratively update as follows:
1. Initialize $k^0 = \delta$, the delta function.
2. Update $k^{n+1} = k^n + \beta(A^T b - (A^T A + \lambda^2 I) k^n)$.
3. Set $k_i^{n+1} = 0$ if $k_i^{n+1} < 0$, and normalize $$k_i^{n+1} = k_i^{n+1} \Big/ \sum_i k_i^{n+1}.$$

The factor $\beta$ is a scalar that controls the convergence. Iteration stops when the change between two steps is sufficiently small. In one implementation, approximately 20 to 30 iterations are run by setting $\beta = 1.0$. In one implementation, iteration is very fast using a Fast Fourier Transform (FFT), taking approximately 8 to 12 seconds for a 64×64 kernel and a 800×600 image. Preconditioning and/or acceleration may be applied for further speed-up.

The hysteresis thresholder 220 can iteratively operate in scale space to make the exemplary image deblurring engine 104 more robust. A straightforward method is to use the kernel 222 estimated at a current level to initialize the next finer level. However, such initialization may be insufficient to control noise in the kernel estimation 222. The noise or errors at coarse levels may be propagated and amplified to fine levels. To suppress noise, the global shape of the kernel at a fine level may be similar to the shape at its coarser level. The hysteresis thresholder 220 aims to achieve this in scale space.

At each level, the hysteresis thresholder 220 defines a kernel mask M by thresholding the kernel values, $M_i = 1$ if $k_i > t k_{max}$, where t is a threshold and $k_{max}$ is the maximum of all kernel values. Two masks $M_{low}$ and $M_{high}$ are computed by setting two thresholds $t_{low}$ and $t_{high}$. $M_{low}$ is larger and contains $M_{high}$. After kernel estimation 222, the hysteresis thresholder 220 sets all elements of $K^l$ outside the mask $M_{high}$ to zero to reduce the noise at level l. Then, at the next finer level l+1, all elements of $K^l + 1$ are set outside the up-sampled mask of $M_{low}$ to zero to further reduce noise. In one implementation, this hysteresis thresholding is performed from coarse to fine. The pyramids are constructed using a down-sampling factor of $1/\sqrt{2}$ until the kernel size at the coarsest level reaches e.g., 9×9 pixels. In one implementation, value selections include $t_{low} = 0.03$, and $t_{high} = 0.05$.

Exemplary Residual Deconvolution Engine

Given the blur kernel K 222, the true image can be reconstructed from $B = I \otimes K$ of Equation (1). An example deconvolution result using a standard Richardson-Lucy (RL) algorithm produces resulting images that contain visible "ringing" artifacts after about 20 iterations with the true kernels; with dark and light ripples around bright features in resulting images. Such ringing artifacts often occur with iterative methods, such as the RL algorithm. More iterations introduce not only more image detail but also more ringing.

The ringing effects are due to the well-known Gibbs phenomena in Fourier analysis at discontinuous points. The discontinuities could be at image edge points, boundaries, or are artificially introduced by the inadequate spatial sampling of the images or the kernels. The larger the blur kernel, the stronger are the ringing artifacts.

The Gibbs oscillations have an amplitude that is independent of the cutoff frequencies of the filter, but are always proportional to the signal jump at the discontinuous points. However, the exemplary image deblurring engine 104 performs deconvolution on relative image quantities to reduce the absolute amplitude of the signals. Thus, in one implementation, instead of performing the deconvolution directly on the blurred image B 106, the deconvolution is performed on the residual blurred image 228, i.e., $\Delta B = \Delta I \otimes K$, to recover the residual image $\Delta I$ 226. The final reconstructed image is $I = N_D + \Delta I$.

The standard RL algorithm introduced above is a ratio-based iterative approach. The RL algorithm enforces the non-negativity of pixel values. When using RL algorithms, residual images 226 should be offset by adding the constant 1, $\Delta I \to \Delta I + 1$ and $\Delta B \to \Delta B + 1$, as all images are normalized to range [0, 1]. After each iteration, the residual image is offset back by subtracting the constant 1, as in Equation (5):

$$\Delta I_{n+1} = \left( K * \frac{\Delta B + 1}{(\Delta I_n + 1) \otimes K} \right) \cdot (\Delta I_n + 1) - 1, \quad (5)$$

where "$*$" is the correlation operator.

Figure 3:
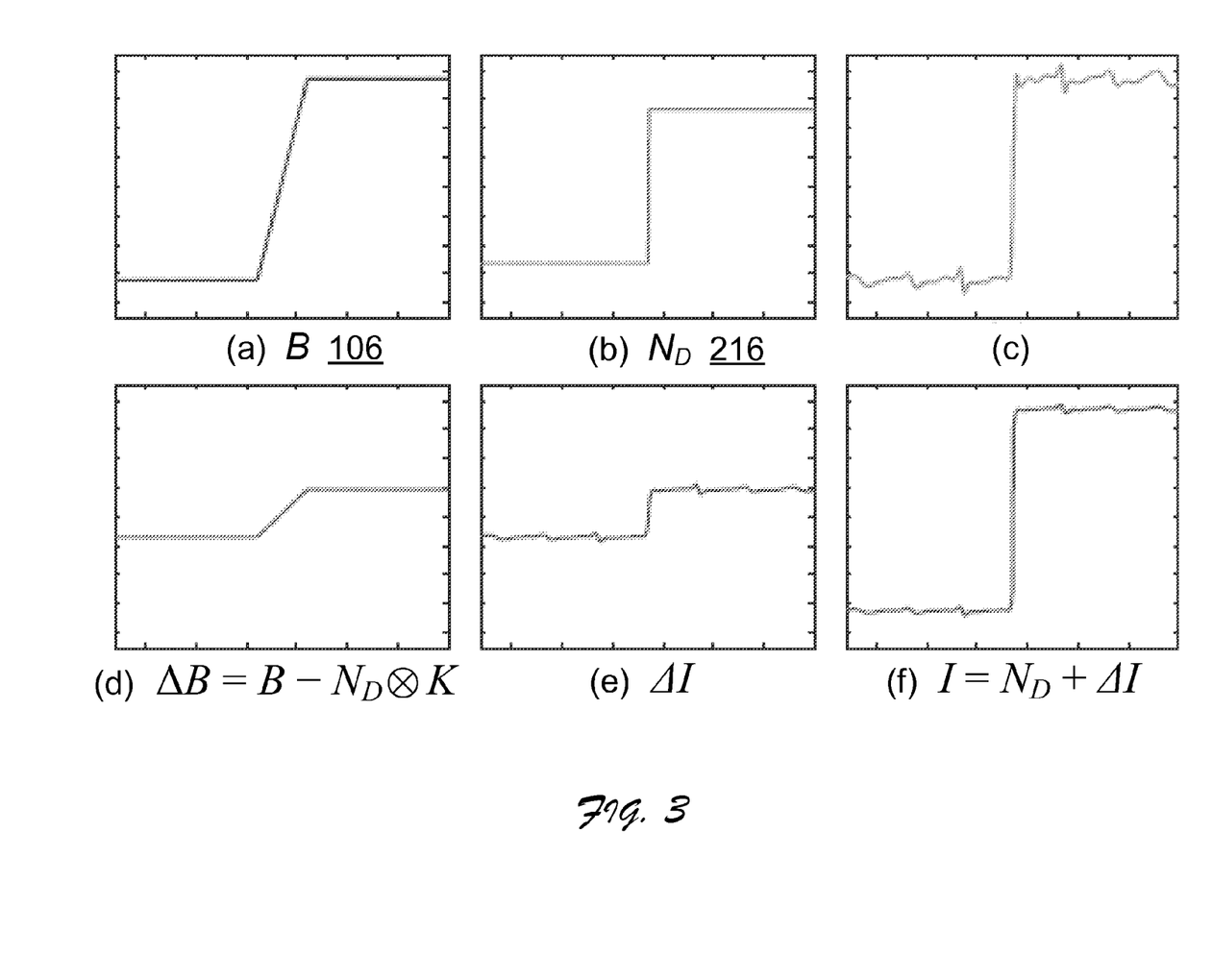
FIG. 3 is a diagram of exemplary residual deconvolution shown in one-dimensional views.

FIG. 3 shows a 1-dimensional example of results from the residual deconvolution engine 206. The ringing artifacts from $\Delta I$ are significantly weaker than those in I because the magnitude of $\Delta B$ (after subtracting $N_D \otimes K$ from B) is much smaller than that of B. FIG. 3(a) shows the blurred signal and the denoised signal. The blur kernel is a box filter. FIG. 3(c) shows the standard deconvolution result from FIG. 3(a). FIG. 3(d) and FIG. 3(e) show the blurred residual signal and its deconvolution result. FIG. 3(f) shows the residual deconvolution result. It is worth noting that the ringing artifact in FIG. 3(f) is smaller than that in FIG. 3(c).

Exemplary De-Ringing Engine with Gain-Controlled RL

The residual deconvolution engine 206 lessens the ringing artifacts and effects, but cannot fully eliminate them. Often, the ringing effects are most distracting in smooth regions because human perception can tolerate small scale ringing effects in highly textured regions. Mid-scale ringing effects are usually more noticeable compared with the fine details and large-scale sharp structures in the image. Strong ringing is mainly caused by high contrast edges and the magnitude of ringing is proportional to the magnitude of image gradient. Based on these observations, the exemplary de-ringing engine 208 uses a gain-controlled RL technique as follows.

For implementing a gain-controlled Richardson-Lucy (RL) technique, the de-ringing engine 208 modifies the residual RL algorithm by introducing a gain map $I_{Gain}$ 234, as in Equation (6):

$$\Delta I_{n+1} = I_{Gain} \cdot \left\{ \left( K * \frac{\Delta B + 1}{(\Delta I_n + 1) \otimes K} \right) \cdot (\Delta I_n + 1) - 1 \right\} \quad (6)$$

where $I_{Gain}$ is a multiplier ($\leq 1$) to suppress the contrast of the recovered residual image $\Delta I$ 226. Since RL is a ratio-based algorithm, the ringing effects are amplified at each iteration by the ratio $$K * \frac{\Delta B + 1}{(\Delta I_n + 1) \otimes K}$$

in Equation (6). Multiplying a factor less than one at each iteration suppresses propagation of the ringing effects. Multiplying a factor will not decrease the overall magnitude of the signal but decreases the contrast of the signal because the ratio $$K * \frac{\Delta B + 1}{(\Delta I_n + 1) \otimes K}$$

will increase the magnitude of the signal in each iteration. At the last iteration, the gain-controlled deconvolution iterator 230 does not multiply the gain map $I_{Gain}$ 234. The image reconstructed by the gain-controlled RL is designated as deconvoluted image $I_g$ 236.

Since it is desirable for the contrast suppressor 232 to suppress the contrast of ringing in the smooth regions while avoiding suppression of sharp edges, the gain map 234 should be small in smooth regions and large in others. Hence, in one implementation the gain map 234 is defined using the gradient of the denoised image 216 as in Equation (7):

$$I_{Gain} = (1 - \alpha) + \alpha \cdot \sum_l \|\nabla N_D^l\|, \qquad (7)$$

where α controls the influence of the gain map 234, and $\nabla N_D^l$ is the gradient of the denoised image 216 at the lth level of the Gaussian pyramid, e.g., with standard deviation 0.5. The parameter α controls the degree of suppression. In one implementation, the value of α is set to 0.2. Aggregated image gradients at multiple scales have also been used in High Dynamic Range (HDR) compression. In the de-ringing engine 208, the gradients of the denoised image 216 provide a gain signal to adaptively suppress the ringing effects in different regions.

Figure 4:
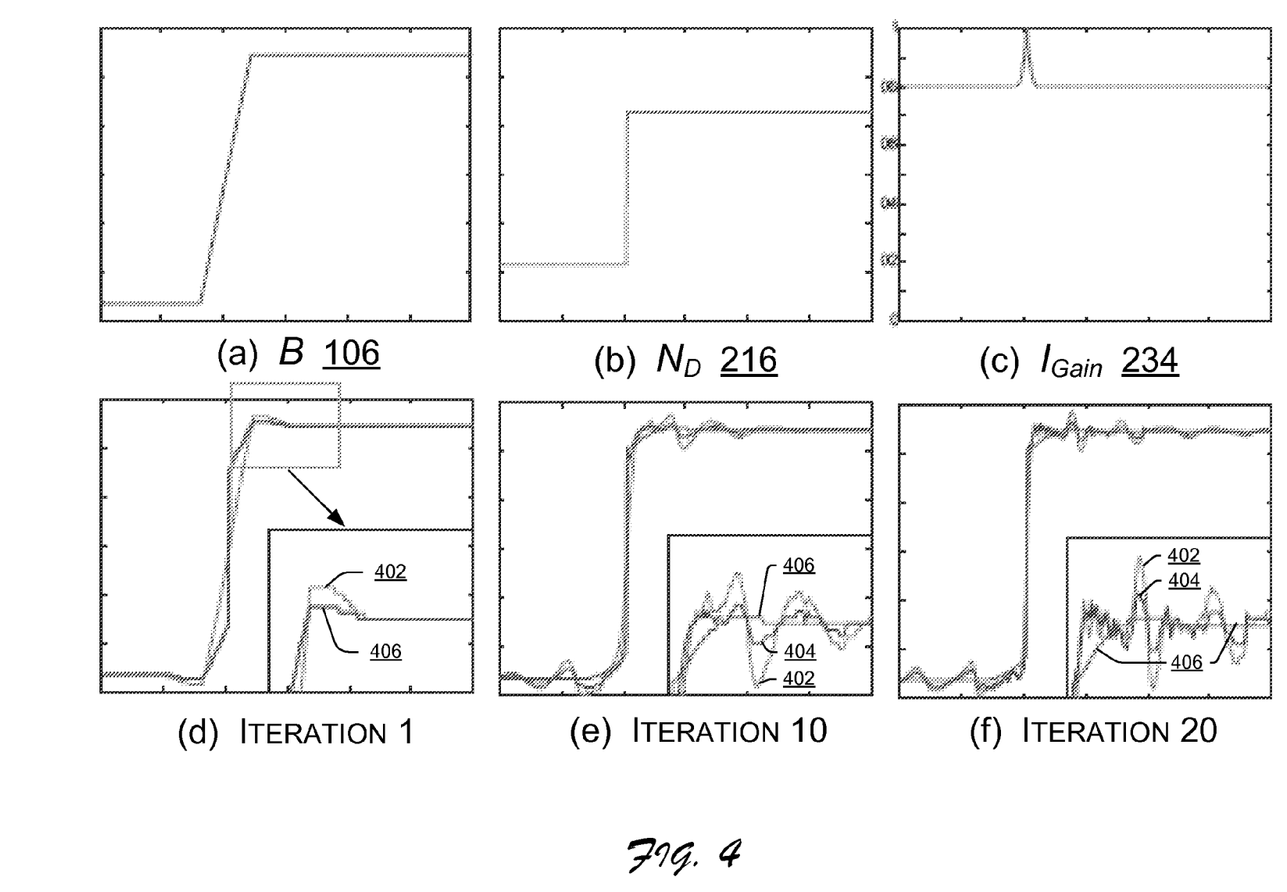
FIG. 4 is a diagram of exemplary gain-controlled deconvolution shown in one-dimensional views.

FIG. 4 shows a one-dimensional example of exemplary gain-controlled RL. It is apparent that the residual RL can reduce the magnitude of ringing compared with the standard RL. In both standard RL and residual RL, the magnitude of ringing increases and the spatial range of ringing spreads gradually, after each iteration. With control from the gain map 234, the ringing effects are suppressed at each iteration (e.g., $I_{Gain}$=0.8 in flat regions). Most importantly, the propagation of ringing is mostly prevented so that the ringing is significantly reduced.

FIGS. 4(a-c) show the blurred signal 106, denoised signal 216, and gain map 234, respectively. The kernel is estimated using B 106 and $N_D$ 216. FIGS. 4(d-f) show deconvolution results obtained by standard RL 402, residual RL 404, and gain-controlled RL 406, after one, ten, and twenty iterations. The plots at the bottom-right corners are blown-up views of the designated selected rectangle. Significantly, the ringing effects are amplified and propagated in standard RL 402 and residual RL 404, but suppressed in exemplary gain-controlled RL 406.

The gain-controlled RL iterator 230 provides clean deconvolution results $I_g$ 236 with large-scale sharp edges, compared with the residual RL result 226. However, some fine details are inevitably suppressed by gain-controlled RL. Fortunately, the de-ringing engine 208 is capable of adding back fine scale image detail from the residual RL result I 236 using the following approach.

The detail layer extractor 238 obtains the fine scale detail layer 242, i.e., $I_d$=I−Ī, using a filter 240 where Ī(x)=F(I(x)) is a filtered image and F(·) is a low-pass filter. In other words, the details layer 242 can be obtained by a high-pass filtering. In one implementation, the detail layer extractor 238 uses joint/cross bilateral filtering, as it preserves large-scale edges in $I_g$ 236, as in Equation (8):

$$F(I(x); I_g) = \frac{1}{Z_x} \sum_{x' \in W(x)} G_d(x - x') G_r(I(x) - I_g(x')) \cdot I_{x'} \qquad (8)$$

where $\sigma_d$ and $\sigma_r$ are spatial and signal deviations of Gaussian kernels $G_d$ and $G_r$. W(x) is a neighboring window and $Z_x$ is a normalization term. In one implementation, the default values of $\sigma_d$ and $\sigma_r$ are 1.6 and 0.08. Compositing the gain-controlled RL result $I_g$ 236 with the detail layer $I_d$ 242 produces the final image 244.

The ringing layer prevented by the de-ringing engine 208 can be observed by subtracting $I_g$ from the filtered image I. The ringing layer mainly contains ripple-like ringing effects. In the final result 244, the ringing artifacts are significantly reduced while the recovered image details from deconvolution are well preserved.

To summarize, the exemplary image deblurring engine 104 iteratively executes the following steps: estimating the kernel K 222, computing the residual deconvolution image 1226, computing the gain-controlled deconvolution image $I_g$ 236, and constructing the final image 244 by adding the detail layer $I_d$ 242. The iterations stop when the change is sufficiently small.

Acquiring a Blurred/Noisy Image Pair

In one implementation, the pair of images 106 and 108 are taken one after the other, in rapid succession, to minimize misalignment. Several techniques can be used to capture such an image pair. For example, two successive shots with different camera settings can be triggered by an onboard (or external) computer connected to the acquiring camera. This frees the user from changing camera settings between two shots. In another technique, exposure bracketing built into many DSLR cameras can be used. Two successive shots can be taken with different shutter speeds by pressing the shutter only once. Using one of these two options just described, the time interval between the two shots can be kept very small, e.g., approximately ⅕ second, which is a small fraction of a typical shutter speed (>1 second) used for acquiring the blurred image 106.

The relative motion between two such shots is mainly a small translation if it is assumed that the blurred image 106 can be modeled by a single blur kernel 222, i.e., that the dominant motion is translation. Because the translation only results in an offset of the kernel, it is unnecessary to align the two images 106 and 108 in this case.

However, the dominant motions between two shots are often translation and in-plane rotation. To correct in-plane rotation, the alignment engine 210 can "draw" two corresponding lines in the blurred/noisy images. In the blurred image 106, the line can be specified along a straight object boundary or by connecting two corner features. The noisy image 108 is rotated around its image center such that two lines are virtually parallel. An advanced exposure bracketing that allows such control can be built into the camera.

Exemplary Methods

Figure 5:
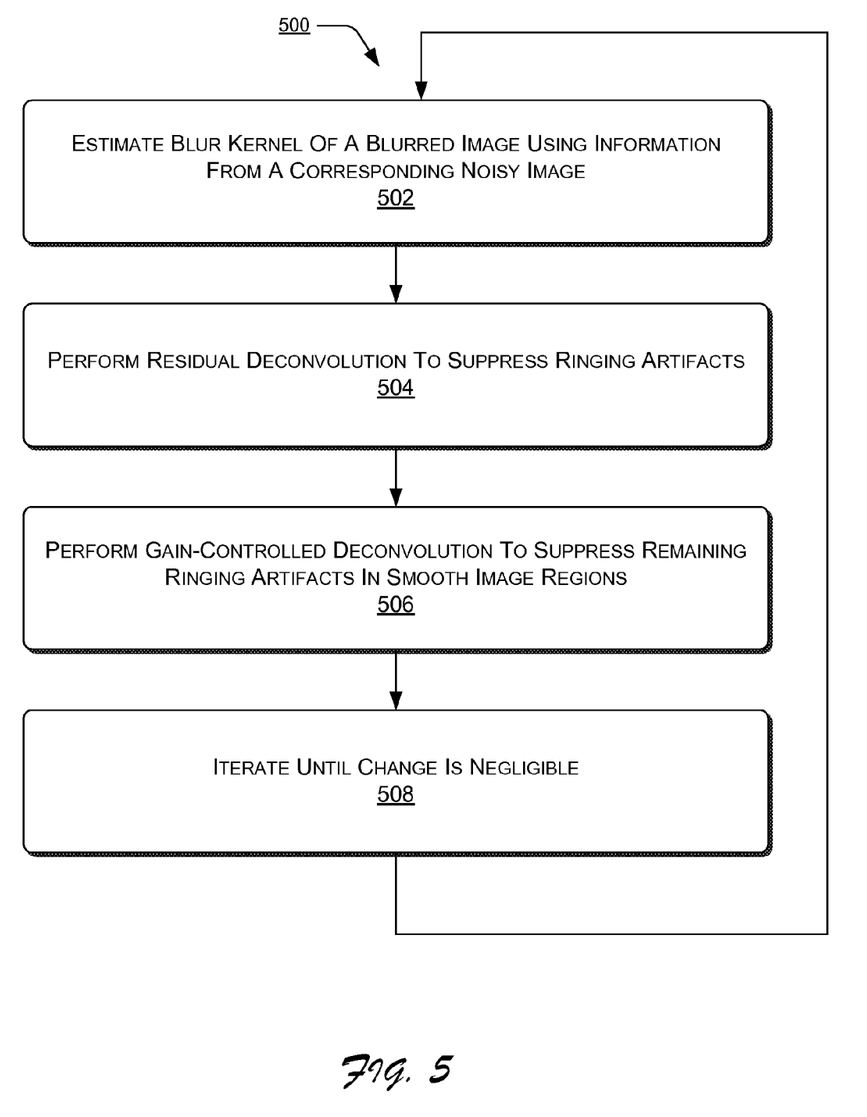
FIG. 5 is a flow diagram of an exemplary method of image deblurring using a blurred/noisy image pair.

FIG. 5 shows an exemplary method 500 of image deblurring using a blurred/noisy image pair. In the flow diagram, the operations are summarized in individual blocks. The exemplary method 500 may be performed by hardware, software, or combinations of hardware, software, firmware, etc., for example, by components of the exemplary image deblurring engine 104.

At block 502, a blur kernel of a blurred image is estimated using information from a corresponding noisy image. This exemplary kernel estimation recovers a very accurate initial kernel from the blurred image by exploiting the large-scale, sharp image structures in the noisy image.

At block 504, residual deconvolution is performed, which suppresses ringing artifacts. An example deconvolution result using a standard Richardson-Lucy (RL) algorithm produces resulting images that contain visible ringing artifacts after about twenty iterations with the true kernels, with dark and light ripples around bright features in resulting images. Such ringing artifacts often occur with iterative methods, such as the RL algorithm. More iterations introduce not only more image details but also more ringing.

The exemplary residual deconvolution, therefore, performs deconvolution on relative image quantities to reduce the absolute amplitude of the signals. Thus, in one implementation, instead of performing the deconvolution directly on the blurred image, the deconvolution is performed on the residual blurred image to recover the residual image, which can be added to a denoised version of the noisy image to compose a high-quality deblurred image.

At block 506, gain-controlled deconvolution is performed to suppress remaining ringing artifacts in smooth image regions. The previous step at block 504 lessens the ringing artifacts and effects, but cannot fully eliminate them. Often, the ringing effects are most distracting in smooth regions because human perception can tolerate small-scale ringing effects in highly textured regions. Strong ringing is mainly caused by high contrast edges and the magnitude of ringing is proportional to the magnitude of image gradient. Based on these observations, the exemplary gain-controlled deconvolution de-rings by applying a gain-controlled Richardson-Lucy (RL) technique and modifies the residual RL algorithm by introducing a gain map to suppress the contrast of the recovered residual image, especially in smooth image regions. This has the effect of suppressing the propagation of ringing effects at each iteration of the exemplary method 500.

At block 508, the three previous steps are iterated until the change in results is negligible, or meets some other selected threshold.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
acquiring a blurred image of a subject;
acquiring a noisy image of the subject;
estimating a blur kernel based on first information from the noisy image and second information from the blurred image; and
combining the first information from the noisy image with the second information from the blurred image to create a deblurred image of the subject, the combining based at least in part on the estimated blur kernel.

2. The method as recited in claim 1, wherein:
the blurred image comprises a first low-quality image acquired with a slow shutter speed and a low ISO setting;
the noisy image comprises a second low-quality image acquired with a fast shutter speed and a high ISO setting; and
the deblurred image comprises a high-quality image.

3. The method as recited in claim 1, further comprising recovering an initial blur kernel from the blurred image using image structures in the noisy image.

4. The method as recited in claim 3, further comprising recovering an initial blur kernel from the blurred image using a denoised version of the noisy image.

5. The method as recited in claim 4, further comprising iteratively performing a least-squares optimization to obtain the blur kernel based on an initial starting image approximated by the denoised version of the noisy image.

6. The method as recited in claim 5, further comprising performing hysteresis thresholding from coarse levels to fine levels to suppress noise during iteratively performing the least-squares optimization.

7. The method as recited in claim 1, further comprising performing a residual deconvolution based on the estimated blur kernel and on the information from the blurred image and on the information from the noisy image to reduce ringing artifacts inherent to image deconvolution.

8. The method as recited in claim 7, wherein performing the residual deconvolution includes iteratively applying a Richardson-Lucy technique.

9. The method as recited in claim 8, wherein the Richardson-Lucy technique is iteratively applied to a residual blurred image to obtain a residual image, wherein the residual image can be combined with a denoised version of the noisy image to produce the deblurred image.

10. The method as recited in claim 7, further comprising performing a gain-controlled deconvolution to suppress remaining ringing artifacts in smooth image regions of a residual image.

11. The method as recited in claim 10, further comprising applying a gain map during iterations of the gain-controlled deconvolution to suppress a visual contrast of the residual image.

12. The method as recited in claim 11, further comprising defining the gain map using a gradient of a denoised version of the noisy image.

13. The method as recited in claim 10, further comprising:
filtering the residual image to obtain a detail layer;
compositing the residual image with the detail layer to produce the deblurred image.

14. The method as recited in claim 1, further comprising iterating between a blur kernel estimation, a residual deconvolution, and a gain-controlled deconvolution to obtain a high-quality instance of the deblurred image.

15. A camera, comprising:
an image capture feature configured to acquire:
a blurred image of a subject taken at a low shutter speed and a low ISO setting; and
a noisy image of the subject taken at a high shutter speed and high ISO setting; and
an image deblurring engine to combine information from the blurred image and the noisy image to produce a high-quality deblurred image of the subject, the image deblurring engine being configured to estimate a blur kernel based on the information form the blurred image and the noisy image.

16. The camera as recited in claim 15, wherein the camera comprises a hand-held device that acquires low-quality images in low-light conditions and produces a high-quality image from the low-quality images.

17. The camera as recited in claim 15, wherein the camera comprises a digital camera configured to acquire low-quality images in low-light conditions and produce a high-quality image from the low-quality images.

18. The camera as recited in claim 15, wherein the image capture feature comprises exposure bracketing.

19. The camera as recited in claim 15, wherein the image capture feature comprises a computer operatively coupled to the camera configured to trigger two or more successive shots, wherein settings of the camera are different for at least two of the two or more successive shots.

20. The camera as recited in claim 15, wherein the image deblurring engine is further configured to estimate a blur kernel based at least in part on first information from the noisy image and second information from the blurred image.

* * * * *